(12) United States Patent
Joo et al.

(10) Patent No.: US 11,549,590 B2
(45) Date of Patent: Jan. 10, 2023

(54) VALVE FOR WATER FLOW CONTROL

(71) Applicant: Kyungdong Navien Co., LTD, Gyeonggi-do (KR)

(72) Inventors: Jae Myung Joo, Seoul (KR); Doo Hyung Jeong, Seoul (KR)

(73) Assignee: KYUNGDONG NAVIEN CO., LTD, Gywonggi-Do (KR)

( * ) Notice: Subject to any disclaimer, the term of this patent is extended or adjusted under 35 U.S.C. 154(b) by 0 days.

(21) Appl. No.: 17/131,640

(22) Filed: Dec. 22, 2020

(65) Prior Publication Data

US 2021/0199199 A1 Jul. 1, 2021

(30) Foreign Application Priority Data

Dec. 31, 2019 (KR) .................. 10-2019-0179711
Nov. 18, 2020 (KR) .................. 10-2020-0154456

(51) Int. Cl.
*F16K 1/226* (2006.01)
*F16K 27/02* (2006.01)
(Continued)

(52) U.S. Cl.
CPC .............. *F16K 1/2265* (2013.01); *F16K 1/02* (2013.01); *F16K 1/46* (2013.01); *F16K 1/482* (2013.01);
(Continued)

(58) Field of Classification Search
CPC . F16K 1/2265; F16K 1/02; F16K 1/46; F16K 1/482; F16K 1/485; F16K 27/0218; F16K 31/50
See application file for complete search history.

(56) References Cited

U.S. PATENT DOCUMENTS 2,658,717 A * 11/1953 Acosta .................... F16K 31/50
251/67
3,712,587 A * 1/1973 Specht .............. F16K 31/52408
251/285
(Continued)

FOREIGN PATENT DOCUMENTS

CN 203051751 U 7/2013
CN 209180457 U 7/2019
(Continued)

OTHER PUBLICATIONS

Extended European Search Report for related EP Application No. 20217741.6 dated May 27, 2021, 12 pages long.
(Continued)

*Primary Examiner* — Patrick C Williams
(74) *Attorney, Agent, or Firm* — Wegman Hessler

(57) ABSTRACT

A valve includes an actuation assembly including a drive device that generates a driving force, a needle shaft connected, at one end thereof, to the drive device to receive the driving force from the drive device and perform linear motion, a needle nut that is coupled to the drive device and that has an empty space through which the needle shaft passes, so as to guide the linear motion of the needle shaft, and a valve disc coupled to an opposite end of the needle shaft, a body is coupled with the actuation assembly and that has a valve opening inside, the valve opening being selectively opened or closed as the valve disc, which is inserted into the body in which water flows, performs linear motion, and a clip that fixes the body and the actuation assembly such that the body and the actuation assembly are not separated from each other.

14 Claims, 11 Drawing Sheets

(51) Int. Cl.
*F16K 1/48* (2006.01)
*F16K 31/50* (2006.01)
*F16K 1/02* (2006.01)
*F16K 1/46* (2006.01)

(52) U.S. Cl.
CPC .......... *F16K 1/485* (2013.01); *F16K 27/0218* (2013.01); *F16K 31/50* (2013.01)

(56) References Cited

U.S. PATENT DOCUMENTS

| | | | | |
|---|---|---|---|---|
| 4,128,391 | A | * | 12/1978 | Braunstein ............... F17C 13/04 137/505.41 |
| 4,550,896 | A | * | 11/1985 | Hansen, III ............ B01D 35/04 137/377 |
| 4,634,093 | A | * | 1/1987 | Schintgen ............... F16K 15/18 251/273 |
| 4,923,173 | A | * | 5/1990 | Szymaszek ............... F16K 1/36 251/333 |
| 6,347,644 | B1 | * | 2/2002 | Channell ................. F16K 11/20 137/597 |
| 8,800,959 | B2 | | 8/2014 | Hasunuma |
| 9,993,821 | B2 | | 6/2018 | Sugiura et al. |
| 2010/0001221 | A1 | * | 1/2010 | Hasunuma ........... G05D 16/202 251/318 |
| 2012/0261601 | A1 | | 10/2012 | Colby et al. |
| 2016/0096177 | A1 | | 4/2016 | Sugiura et al. |
| 2016/0201809 | A1 | * | 7/2016 | Varga ........................ F16K 1/46 251/84 |
| 2017/0130866 | A1 | * | 5/2017 | Rogalka .................... G01F 1/44 |
| 2019/0111290 | A1 | | 4/2019 | Felberg et al. |

FOREIGN PATENT DOCUMENTS

| | | |
|---|---|---|
| DE | 10162794 A1 | 7/2003 |
| DE | 102011082638 A1 | 3/2013 |
| JP | H08021554 | 1/1996 |
| JP | H11-294624 A | 10/1999 |
| JP | 2007-024274 A | 2/2007 |
| JP | 2010-014260 A | 1/2010 |
| JP | 2010043727 | 2/2010 |
| JP | 2016-075300 A | 5/2016 |
| JP | 2016-151293 A | 8/2016 |
| KR | 10-2009-0121426 A | 11/2009 |
| KR | 10-2017-0113208 A | 10/2017 |

OTHER PUBLICATIONS

First Office Action for related Japanese Patent Application No. 2020-216703 dated Feb. 22, 2022, 6 pages long.
1st Office Action for the corresponding Korean Patent Application No. 10-2020-0154456, dated Jul. 25, 2022, 7 pages.
1st Office Action for the corresponding European Patent Application No. 20217741.6, dated Aug. 22, 2022, 8 pages.
Office Action for corresponding Chinese Patent Application No. 202011624617.2, dated Oct. 25, 2022, 21 pages.

* cited by examiner

VALVE FOR WATER FLOW CONTROL

CROSS-REFERENCE TO RELATED APPLICATION

This application claims the benefit of priority to Korean Patent Application Nos. 10-2019-0179711 and 10-2020-0154456, filed in the Korean Intellectual Property Office on Dec. 31, 2019 and Nov. 18, 2020, respectively, the entire contents of which are incorporated herein by reference.

TECHNICAL FIELD

The present disclosure relates to a valve for water flow control.

BACKGROUND

A valve for water flow control is a component disposed to control water flow in a water-heating device such as a boiler. The water flow control valve may regulate the flow rate of water flowing therein, by making a physical change in response to an electrical control signal.

The valve may be implemented by a coupling of various components, rather than being integrally formed. The components need to be firmly coupled to maintain water tightness of the valve because water flows through the valve.

However, counterpart objects may be coupled to the valve at right angles, or the valve and the counterpart objects may be densely disposed in the narrow water-heating device, and therefore when the inside of the valve has to be checked for inspection or management of the valve, the valve may not be easily assembled or disassembled due to a deficiency in space in the water-heating device and interference by other fixed components.

Meanwhile, the water flow control valve, which regulates the flow rate of water to meet a hot-water temperature set in the water-heating device, has to be able to approximately linearly control water flow for predictable control. In a case where a flow-rate change is nonlinear, flow rates have to be measured for changes of various conditions, such a differential-pressure change, a valve angle change, and the like, and thereafter have to be reflected in control logic. In contrast, in a case where a flow-rate change is linear, the number of conditions required for design of control logic and the number of flow-rate data may be significantly reduced.

SUMMARY

The present disclosure has been made to solve the above-mentioned problems occurring in the prior art while advantages achieved by the prior art are maintained intact.

An aspect of the present disclosure provides an easy-to-manage valve for water flow control.

Another aspect of the present disclosure provides a valve for linearly changing a flow rate.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a valve includes an actuation assembly including a drive device that generates a driving force, a needle shaft connected, at one end thereof, to the drive device to receive the driving force from the drive device and perform linear motion, a needle nut that is coupled to the drive device and that has an empty space through which the needle shaft passes, so as to guide the linear motion of the needle shaft, and a valve disc coupled to an opposite end of the needle shaft, a body that is coupled with the actuation assembly and that has a valve opening inside, the valve opening being selectively opened or closed as the valve disc, which is inserted into the body in which water flows, performs linear motion, and a clip that fixes the body and the actuation assembly such that the body and the actuation assembly are not separated from each other.

According to another aspect of the present disclosure, a valve includes an actuation assembly including a drive device that generates a driving force, a needle shaft connected, at one end thereof, to the drive device to receive the driving force from the drive device and perform linear motion, a needle nut that is coupled to the drive device and that has an empty space through which the needle shaft passes, so as to guide the linear motion of the needle shaft, and a valve disc coupled to an opposite end of the needle shaft, and a body that is coupled with the actuation assembly and that has a valve opening inside, the valve opening being selectively opened or closed as the valve disc, which is inserted into the body in which water flows, performs linear motion. The valve disc is coupled to a distal end of the needle shaft that faces a reference direction and that further protrudes beyond the needle nut along the reference direction. The valve disc has a convex shape along the reference direction. The valve disc is formed such that an effective region of a flow passage formed between a periphery of the valve opening and an outer surface of the valve disc that is most adjacent to the periphery of the valve opening is formed like a side surface of a truncated cone when the valve disc performs the linear motion along the reference direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
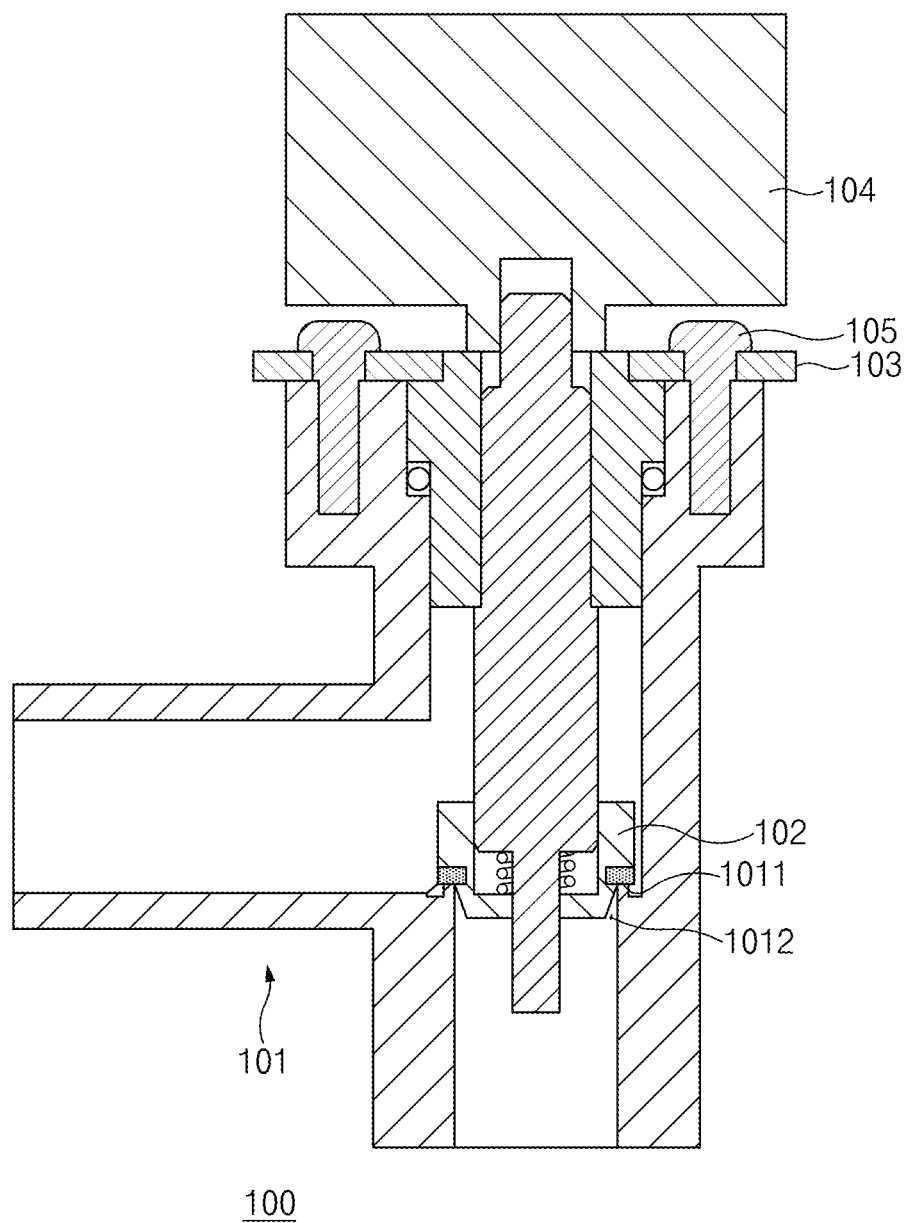
FIG. 1 is a vertical sectional view of an exemplary valve.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

FIG. 1 is a vertical sectional view of an exemplary valve 100.

Referring to FIG. 1, the exemplary valve 100 may include a body 101, a valve disc 102, a connecting member 103, and a drive device 104. The valve disc 102 may be raised or lowered inside the body 101 to adjust opening/shutting of the valve 100. When the valve 100 is shut, an outer portion of the valve disc 102 may be seated on a valve seat 1011 formed around a valve opening 1012, and an inner portion of the valve disc 102 may be inserted into the valve opening 1012.

The body 101 and the drive device 104, which raises or lowers the valve disc 102, may be connected with each other by using the connecting member 103. The connecting member 103 may be placed in a correct position on the body 101 and may be fastened with the body 101 through fasteners 105, and the drive device 104 may be placed in a correct position on the connecting member 103 and may be fastened with the connecting member 103 through any other fasteners. Accordingly, the body 101 and the drive device 104 may not be coupled with each other at one time, but may be coupled with each other through the plurality of steps, and the number of steps required for assembly may be increased if a process of coupling, to the drive device 104, components connected to the drive device 104 to raise or lower the valve disc 102 is included.

Figure 2:
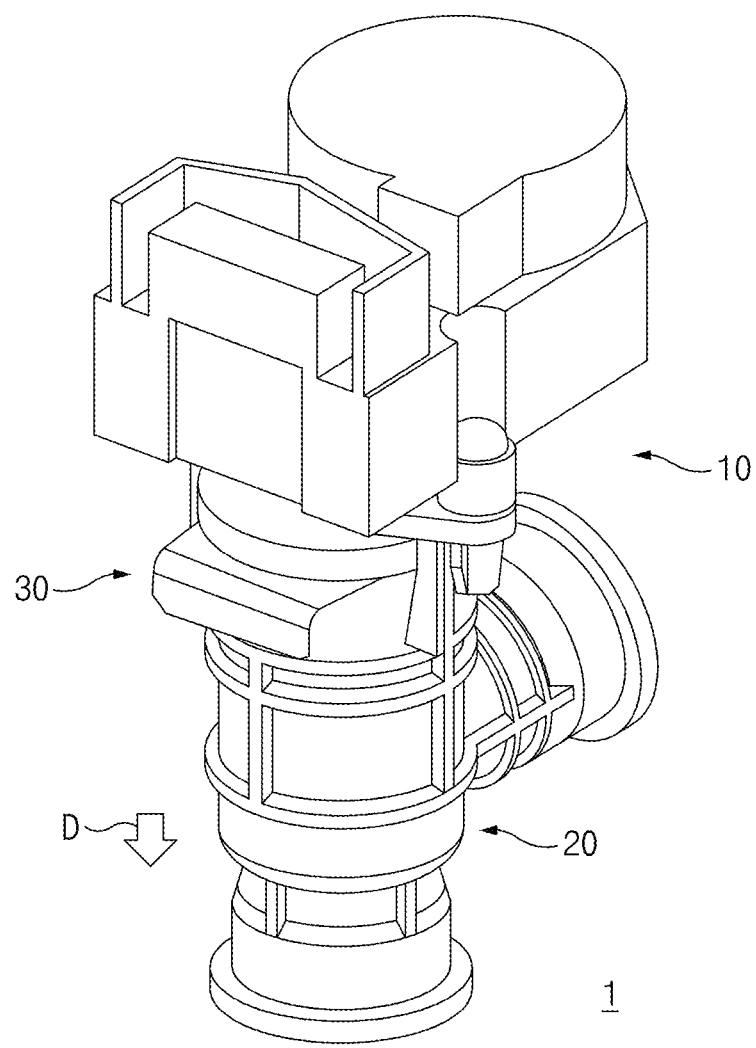
FIG. 2 is a perspective view of a valve according to an embodiment of the present disclosure.
Figure 3:
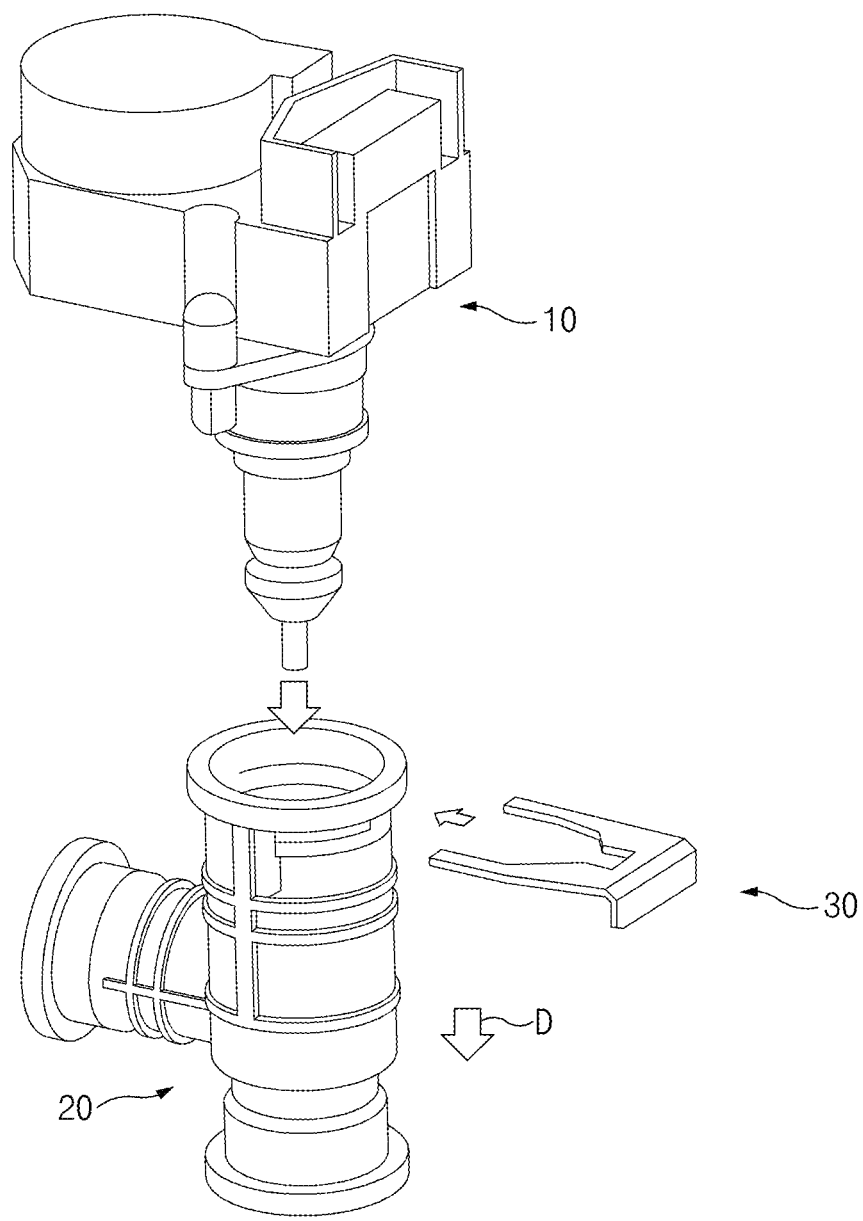
FIG. 3 is a view illustrating a situation of assembling the valve according to the embodiment of the present disclosure.

FIG. 2 is a perspective view of a valve 1 according to an embodiment of the present disclosure. FIG. 3 is a view illustrating a situation of assembling the valve 1 according to the embodiment of the present disclosure.

Referring to FIGS. 2 and 3, the valve 1 according to the embodiment of the present disclosure may include an actuation assembly 10, a body 20, and a clip 30.

The actuation assembly 10 and the body 20 may be coupled with each other in such a manner that the actuation assembly 10 is inserted into the body 20 and thereafter the clip 30 is inserted into the actuation assembly 10 and the body 20. As illustrated, the actuation assembly 10 may be inserted into the body 20 along a reference direction D from the opposite side to the body 20 with respect to the reference direction D, and the clip 30 may be inserted into the actuation assembly 10 and the body 20 in a direction across the reference direction D and may fix the positions of the actuation assembly 10 and the body 20 relative to each other.

In the embodiment of the present disclosure, the reference direction D may be a vertically downward direction, and the direction in which the clip 30 is inserted into the actuation assembly 10 and the body 20 may be a horizontal direction. However, the directions are not limited thereto.

The valve 1 according to the embodiment of the present disclosure may be broadly divided into the actuation assembly 10, the body 20, and the clip 30, and the actuation assembly 10 and the body 20 may be simply coupled with or separated from each other by using the clip 30 instead of using a plurality of fasteners 16 (refer to FIG. 5) that have to be fastened or unfastened using a tool. A coupling structure of the body 20 and the clip 30 will be described below in detail in description of the clip 30.

Body 20

Figure 4:
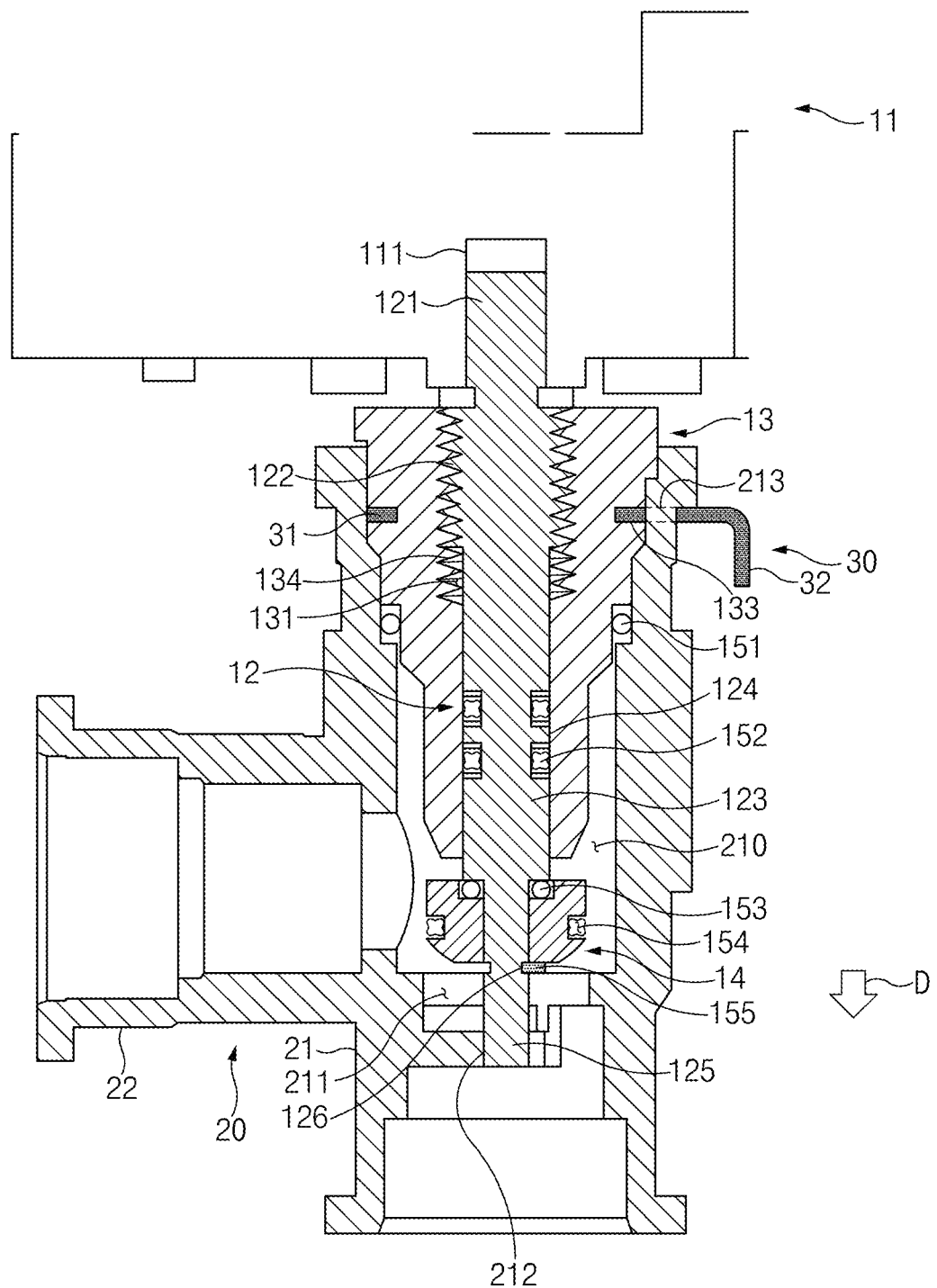
FIG. 4 is a vertical sectional view of the valve according to the embodiment of the present disclosure.
Figure 5:
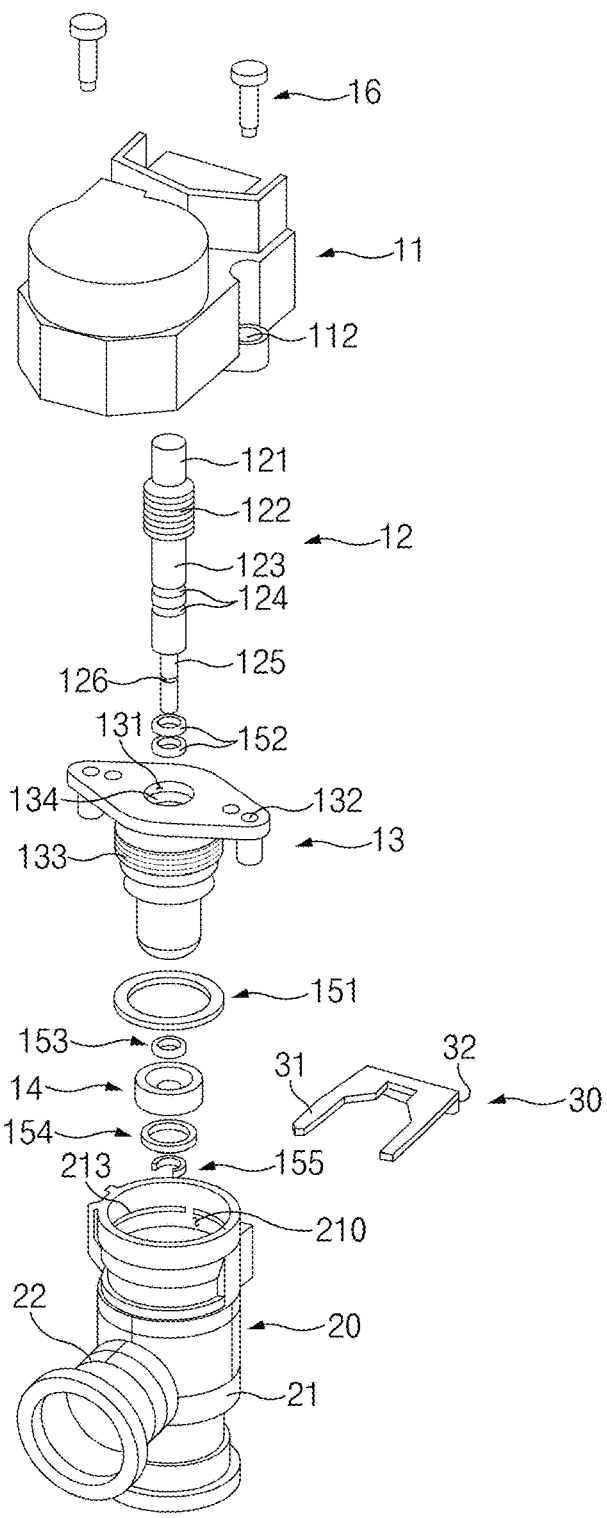
FIG. 5 is an exploded perspective view of the valve according to the embodiment of the present disclosure.

FIG. 4 is a vertical sectional view of the valve 1 according to the embodiment of the present disclosure. FIG. 5 is an exploded perspective view of the valve 1 according to the embodiment of the present disclosure.

Components of the valve 1 will be described below with additional reference to FIGS. 4 and 5. The body 20 may be a part having a space in which water flows. The body 20 may be formed in a hollow pipe shape and may allow the water to flow therethrough, and one end of the body 20 may be connected with a part that supplies the water to the valve 1.

As the valve 1 essentially serves to release the water flowing in an interior space 210 formed inside the body 20 or stop the release of the water, the body 20 may have a valve opening 211 inside, which is selectively opened or closed by the actuation assembly 10. The actuation assembly 10 and the body 20 may be coupled with each other, and the positions of the actuation assembly 10 and the body 20 relative to each other may be fixed.

The actuation assembly 10 may be inserted into the body 20 through which the water flows. A portion of the actuation assembly 10 inserted into the body 20 may include a valve disc 14. The valve disc 14 may be linearly moved by the actuation assembly 10 and may selectively open or close the valve opening 211.

The body 20 may include a main body 21 into which the actuation assembly 10 is inserted and that has the valve opening 211 formed therein and a branch 22 that is connected with a device for delivering the water into the body 20 and that delivers the water to the main body 21. The main body 21 may have a pipe shape that extends along the reference direction D and that is open at opposite ends with respect to the reference direction D. The actuation assembly 10 may be inserted into the main body 21 through the open one end of the main body 21, and the water may be released through the open opposite end of the main body 21. The valve opening 211 may be located in a lower position than a portion of the main body 21 to which the branch 22 is connected. This is because the water delivered to the main body 21 has to be released through the valve opening 211.

The branch 22 may have a pipe shape that passes through a side surface of the main body 21 and extends outward from the main body 21 along a direction across the main body 21 and that is open at an outer distal end. The device for supplying the water into the valve 1 may be coupled to the outer distal end of the branch 22, and the water may flow through the branch 22 and may be delivered to the main body 21. As illustrated, the main body 21 and the branch 22 may form the body 20 having the shape of "T".

As the actuation assembly 10 is inserted into the main body 21, a portion of the main body 21 that surrounds a needle nut 13 of the actuation assembly 10, which will be described below, may exist. A clip insertion opening 213 may be formed through the portion of the main body 21. The clip insertion opening 213 may have a shape extending along a portion of the periphery of the main body 21. Through the clip insertion opening 213, an insert 31 of the clip 30 may be inserted into the main body 21, or may pass through the main body 21 from the inside to the outside.

A center hole 212 may be formed on one side of the valve opening 211 along the reference direction D. The center hole 212 may be formed along the reference direction D such that a small-diameter part 125 is inserted into the center hole 212. The center hole 212 may be defined by an inner surface of the body 20 and may have a diameter greater than or equal to the outer diameter of the small-diameter part 125 to guide linear motion of the small-diameter part 125 inserted into the center hole 212. In a state in which the valve disc 14 is not inserted into the valve opening 211, the water introduced into the valve opening 211 may be released outside the body 20 along the reference direction D through any other holes (not illustrated) around the center hole 212.

Clip 30

Figure 6:
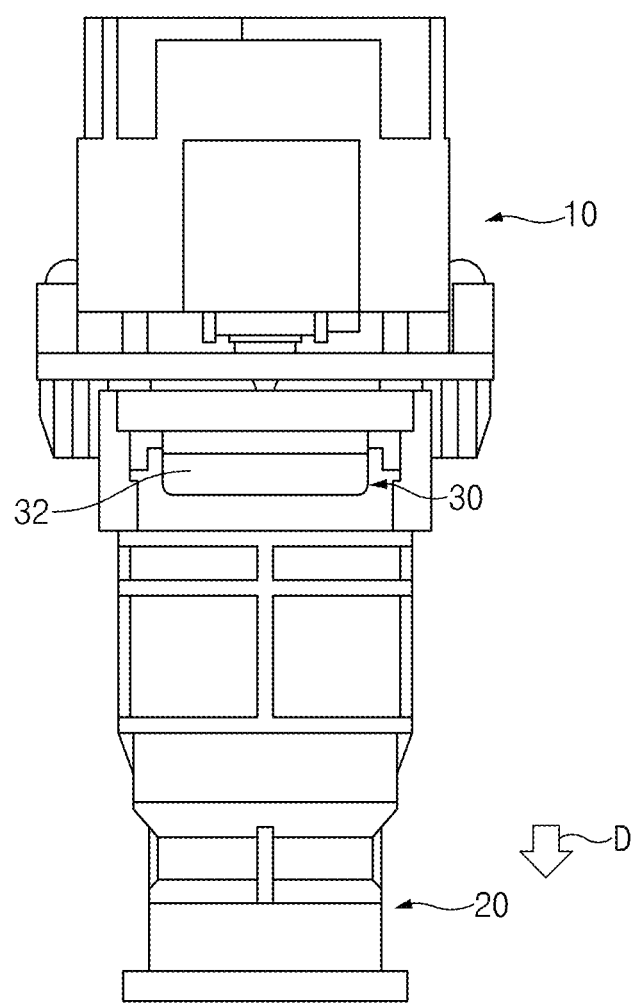
FIG. 6 is a side view of the valve according to the embodiment of the present disclosure.

FIG. 6 is a side view of the valve 1 according to the embodiment of the present disclosure.

The clip 30 may serve to fix the actuation assembly 10 and the body 20 such that the actuation assembly 10 and the body 20 are not separated from each other. The clip 30 may pass through the clip insertion opening 213 formed in the body 20 and may be inserted into a clip insertion groove 133 of the needle nut 13, which will be described below, to fix the actuation assembly 10 and the body 20.

The clip 30 may include the insert 31 and a handle 32. The insert 31 may be inserted into the clip insertion groove 133 and the clip insertion opening 213. The insert 31 may be split into two parts. The two parts of the insert 31 may pass through the clip insertion opening 213 and may surround the needle nut 13 on the opposite sides. The handle 32 may extend along a direction in which the clip insertion groove 133 and the clip insertion opening 213 are formed or open.

The handle 32 may be a part located outside the body 20 when the insert 31 fixes the needle nut 13 and the body 20. The handle 32 may have a shape bent and extending from the insert 31 and may allow a user to easily grasp the clip 30 and couple or separate the clip 30. The insert 31 may extend along a horizontal direction perpendicular to the reference direction D, and the handle 32 may extend downward from the insert 31. However, the directions in which the insert 31 and the handle 32 extend are not limited thereto.

When the insert 31 is inserted into the clip insertion groove 133 and the clip insertion opening 213, portions of inner sides of the two parts of the insert 31 may be inserted into the clip insertion groove 133, and distal ends of the insert 31 and other portions of the insert 31 that are located adjacent to the handle 32 may pass through the clip insertion opening 213. Accordingly, the insert 31 may be simultaneously caught in the body 20 and the needle nut 13, and thus the clip 30 may prevent the body 20 and the needle nut 13 from moving relative to each other along the reference direction D or the opposite direction thereto. To separate the body 20 and the actuation assembly 10 from each other, the clip 30 has only to be removed. Accordingly, assembly and disassembly of the actuation assembly 10 and the body 20 may be facilitated by using the clip 30.

Actuation Assembly 10

The actuation assembly 10 may allow or block a water flow in the body 20. The actuation assembly 10 may operate to open or close the valve opening 211 of the valve 211 and may include a drive device 11, a needle shaft 12, the needle nut 13, and the valve disc 14.

The drive device 11 may receive electric power and may generate a driving force. A motor, an actuator, or the like may be used as the drive device 11. A stepping motor may preferably be used as the drive device 11. However, the drive device 11 is not limited thereto. The drive device 11 may generate a rotational force as the driving force.

The needle shaft 12 may receive the driving force from the drive device 11 and may perform linear motion. The needle shaft 12 may be connected, at one end thereof, to a connecting part 111 of the drive device 11. For transmission of the driving force from the drive device 11 to the needle shaft 12, the connecting part 111 of the drive device 11 may have gear teeth on an inner surface thereof, and the needle shaft 12 may have, on an outer surface of one end 121 thereof, gear teeth that are engaged with the gear teeth of the connecting part 111.

The needle shaft 12 may have a rod shape extending along the reference direction D. The one end 121 of the needle shaft 12 that faces the opposite direction to the reference direction D may be connected to the connecting part 111 of the drive device 11, and an opposite end of the needle shaft 12 that faces the reference direction D may be connected to the valve disc 14.

The needle shaft 12 may perform linear motion by using the driving force transmitted from the drive device 11. The drive device 11 may generate a rotational force, and therefore the needle shaft 12 may perform linear motion while rotating. To enable the motion, an external male thread 122 may be formed on a portion of an outer surface of the needle shaft 12 and may be engaged with an internal female thread 134 formed on a portion of an inner surface of the needle nut 13. That is, similarly to a lead screw, the needle shaft 12 engaged with the inner surface of the needle nut 13 may perform linear motion in the reference direction D or the opposite direction thereto along the inner surface of the needle nut 13 while being rotated by the drive device 11.

The needle shaft 12 may be formed in a cylindrical shape. The needle shaft 12 may have a shape in which two cylinders having different diameters are joined side by side along a lengthwise direction. One cylinder having a relatively large diameter may be referred to as a large-diameter part 123, and the other cylinder having a relatively small diameter may be referred to as the small-diameter part 125. The external male thread 122 may be formed on the large-diameter part 123, and a distal end of the needle shaft 12 that is coupled to the drive device 11 and that faces the opposite direction to the reference direction D may be a portion of the large-diameter part 123. Linear motion of the large-diameter part 123 along the reference direction D may be guided by the needle nut 13.

The large-diameter part 123 may have shaft grooves 124 concavely formed on an outer surface thereof, and shaft rings 152 may be inserted into the shaft grooves 124. As many shaft grooves 124 as the shaft rings 152 may be formed. In an embodiment of the present disclosure, it is exemplified that two shaft grooves 124 are formed to correspond to two shaft rings 152. However, the numbers of shaft grooves 124 and shaft rings 152 are not limited thereto.

The shaft rings 152 may serve to maintain water tightness between the needle shaft 12 and the needle nut 13. The shaft rings 152 may be formed of an elastic material and may have an annular shape. The shaft rings 152 may maintain the water tightness during a movement of the needle shaft 12 relative to the needle nut 13 by making contact with the outer surface of the needle shaft 12 and the inner surface of the needle nut 13 that defines an empty space 131.

The shaft rings 152 may be Quad-rings, the cross-sections of which have four protruding portions. Accordingly, each of the shaft rings 152 may have two contact points for one contact surface. As a result, the shaft ring 152 may easily maintain the water tightness between the needle shaft 12 and the needle nut 13 and may be prevented from being twisted.

The small-diameter part 125 may extend along the reference direction D from a distal end of the large-diameter part 123 that faces the reference direction D. The small-diameter part 125 may be inserted into the center hole 212 formed inside the body 20. Accordingly, linear motion of the small-diameter part 125 along the reference direction D may be guided by the center hole 212.

The small-diameter part 125 may have a fixing groove 126 concavely formed on an outer surface thereof, and a fixing ring 155 may be inserted into the fixing groove 126. The fixing ring 155 may fix the valve disc 14 to prevent separation of the valve disc 14 from the needle shaft 12 and may be formed in the shape of "C". In a state in which the small-diameter part 125 is coupled with the valve disc 14 by being inserted into a center hole of the valve disc 14, the fixing ring 155 may be inserted into the fixing groove 126, which is formed on a portion of the small-diameter part 125 that is located on one side of the valve disc that faces the reference direction D, and may prevent separation of the valve disc 14 in the reference direction D. Separation of the valve disc 14 in the opposite direction to the reference direction D may be prevented by the large-diameter part 123.

The actuation assembly 10 may further include a buffer ring 153. The buffering 153 may be coupled to the small-diameter part 125 and may be disposed between the valve disc 14 and the large-diameter part 123. The buffer ring 153 may be formed of an elastic material and may perform a buffering action by applying an elastic force to the valve disc 14 when the valve disc 14 is forced in the opposite direction to the reference direction D. The buffer ring 153 may prevent leakage that is likely to occur between the valve disc 14 and the needle shaft 12 in a situation where a flow passage is completely closed.

To guide linear motion of the needle shaft 12, the needle nut 13 may have the empty space 131 through which the needle shaft 12 passes. The needle nut 13 may be coupled with the drive device 11 and the body 20 and may connect components of the valve 1. The clip 30 may participate in a coupling of the needle nut 13 and the body 20, and the fasteners 16 may be used to couple the drive device 11 and the needle nut 13.

The actuation assembly 10 may be formed by coupling the drive device 11 and the needle shaft 12, inserting the needle shaft 12 into the empty space 131 of the needle nut 13, seating the drive device 11 on the needle nut 13, and coupling the drive device 11 and the needle nut 13 using the fasteners 16. The drive device 11 and the needle nut 13 may have drive device fastening holes 112 and needle nut fastening holes 132 formed therein, respectively, and may be coupled with each other by the fasteners 16 fastened through the drive device fastening holes 112 and the needle nut fastening holes 132. However, the connecting member 103 is not required when the drive device 11 and the needle nut 13 are coupled.

The needle nut 13 may have a tapered shape in which portions having gradually decreasing cross-sectional areas and portions having constant cross-sectional areas alternate with one another along the reference direction D.

The needle nut 13 may be inserted into the body 20 in the reference direction D and may be coupled to the body 20 by the clip 30. To this end, the needle nut 13 may have the clip insertion groove 133 concavely formed on a portion of an outer surface of the needle nut 13 that is inserted into the body 20.

A nut ring 151 may be disposed between the outer surface of the needle nut 13 and the inner surface of the body 20 that defines the interior space 210. The nut ring 151 may serve to maintain water tightness between the needle nut 13 and the body 20. The nut ring 151 may be formed of an elastic material and may have an annular shape.

The actuation assembly 10 may include the valve disc 14. The valve disc 14 may be inserted into or withdrawn from the valve opening 211 of the body 20 to selectively open or close the valve opening 211.

Figure 7:
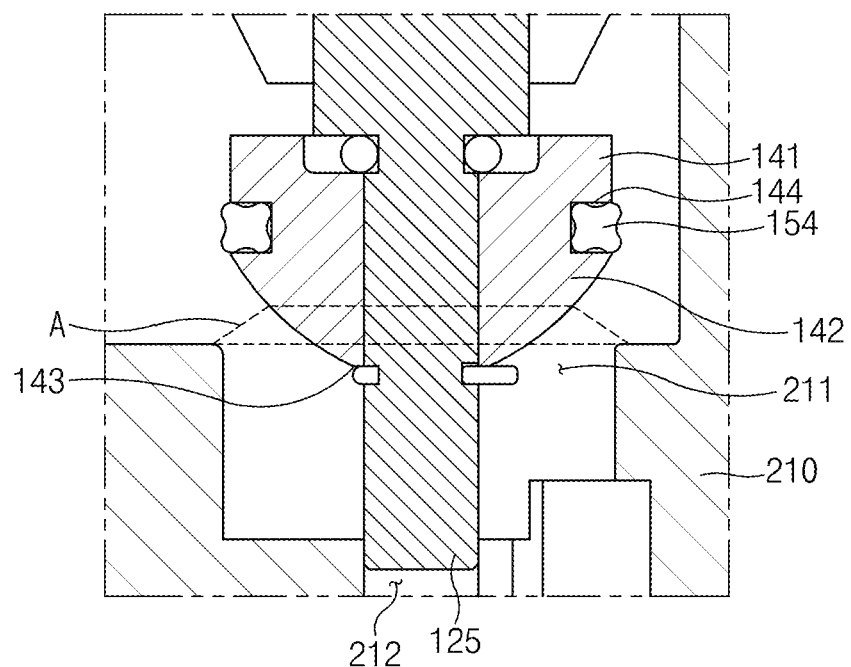
FIG. 7 is a detailed view illustrating a region adjacent to a valve disc according to an embodiment of the present disclosure.

FIG. 7 is a detailed view illustrating a region adjacent to the valve disc 14 according to an embodiment of the present disclosure.

The valve disc 14 may be coupled to the small-diameter part 125 that further protrudes along the reference direction D beyond the needle nut 13 and that is located at a distal end of the needle shaft 12 that faces the reference direction D. The valve disc 14 may have a convex shape along the reference direction D.

The valve disc 14 may be formed such that the shape of an effective region "A" of a flow passage formed between the periphery of the valve opening 211 and a portion of an outer surface of the valve disc 14 that is most adjacent to the periphery of the valve opening 211 is formed like a side surface of a truncated cone when the valve disc 14 performs linear motion along the reference direction D. Here, the effective region "A" refers to a portion of the entire flow passage that has the smallest width and that determines the total flow rate of water flowing along the flow passage.

To form the effective region "A", the valve disc 14 may have a tapered shape in which the area of a cross-section perpendicular to the reference direction D gradually decreases along the reference direction D. The shape of the valve disc 14 may be formed such that the area of the flow passage formed in the shape of the side surface of the truncated cone is linearly changed in proportion to displacement by which the valve disc 14 moves in the reference direction D or the opposite direction to the reference direction D.

Furthermore, because the valve disc 14 according to the embodiment of the present disclosure does not have the protruding portion of the exemplary valve disc 102 (refer to FIG. 1) that protrudes outward along the direction perpendicular to the reference direction D, the valve seat 1011 on which the valve disc 102 is seated may not be formed on the inner surface of the body 20. Due to this structure, a situation where the effective region "A" formed in the shape of a truncated cone is suddenly deformed into a different shape to cause a sudden flow-rate change may be prevented.

Accordingly, the valve 1 according to the embodiment of the present disclosure, which includes the valve disc 14 having the above-described shape and the valve opening 211 opened or closed by the valve disc 14, may linearly control a flow rate as a whole.

The valve disc 14 may have a pillar portion 141 and a protruding portion 142. The pillar portion 141 may be formed in a cylindrical shape having a diameter smaller than or equal to the diameter of the valve opening 211, and the protruding portion 142 may be formed in a convex shape that protrudes along the reference direction D from a side of the pillar portion 141 that faces the reference direction D. The above-described flow passage may be formed between boundaries of the protruding portion 142 and the valve opening 211. An outer surface of the pillar portion 141 may be brought into close contact with the inner surface of the body 20 that defines the valve opening 211 and may participate in closing the valve opening 211.

A distal end surface 143 that is a flat surface formed at a distal end of the valve disc 14 that faces the reference direction D may be perpendicular to the reference direction D. That is, at a distal end of the protruding portion 142 that faces the reference direction D, the distal end surface 143 may be formed as if it is cut with a plane perpendicular to the reference direction D.

A disc groove 144 may be concavely formed on the outer surface of the valve disc 14. An annular disc ring 154 may be inserted into the disc groove 144. That is, the valve disc 14 may be inserted into the disc ring 154, and the disc ring 154 may be caught in the disc groove 144.

The disc groove 144 may be concavely formed on an outer surface of a portion where the pillar portion 141 and the protruding portion 142 meet. Accordingly, the disc groove 144 may be formed in the position where the protruding portion 142 ends, and the valve opening 211 may be closed after the flow passage is formed by the protruding portion 142.

The disc ring 154 may be disposed between the valve disc 14 and the inner surface of the body 20 that defines the valve opening 211 and may maintain water tightness therebetween. In addition, the disc ring 154 may allow the valve opening 211 to be assuredly closed by the valve disc 14. The disc ring 154 may be formed of an elastic material so as to easily make contact with the inner surface of the body 20 while surrounding the valve disc 14. An outer surface of the disc ring 154 may make contact with the inner surface of the body 20, which defines the valve opening 211, to close the valve opening 211 when the valve disc 14 moves along the reference direction D and is inserted into the valve opening 211. The disc ring 154 may be a Quad-ring, the cross-section of which has four protruding portions.

Another Embodiment

Figure 8:
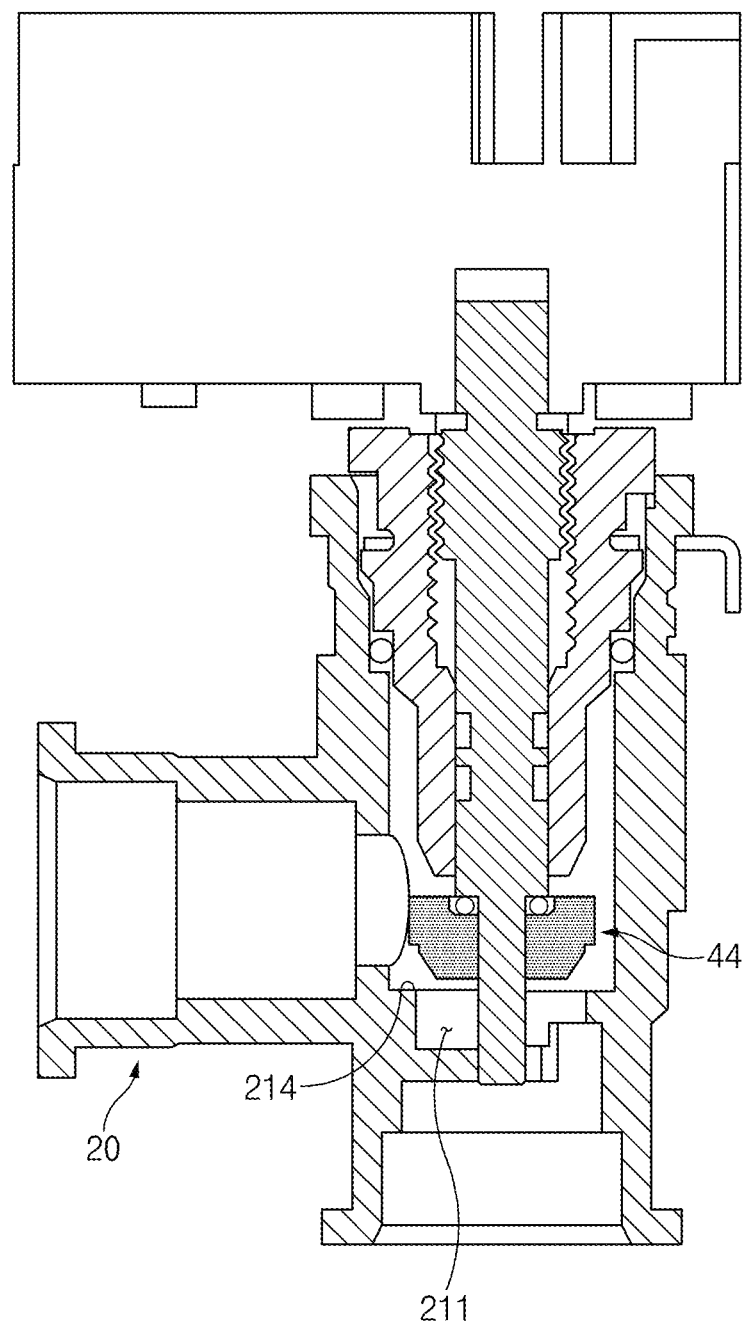
FIG. 8 is a vertical sectional view of a valve according to another embodiment of the present disclosure.
Figure 9:
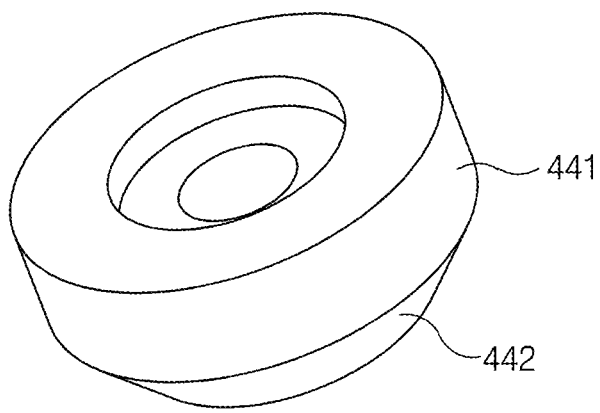
FIG. 9 is a perspective view of a valve disc according to another embodiment of the present disclosure.
Figure 10:
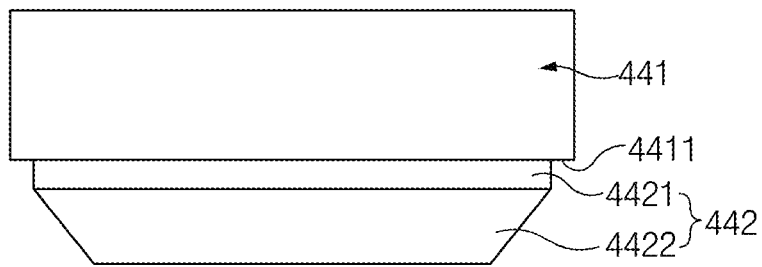
FIG. 10 is a front view of the valve disc according to the other embodiment of the present disclosure.
Figure 11:
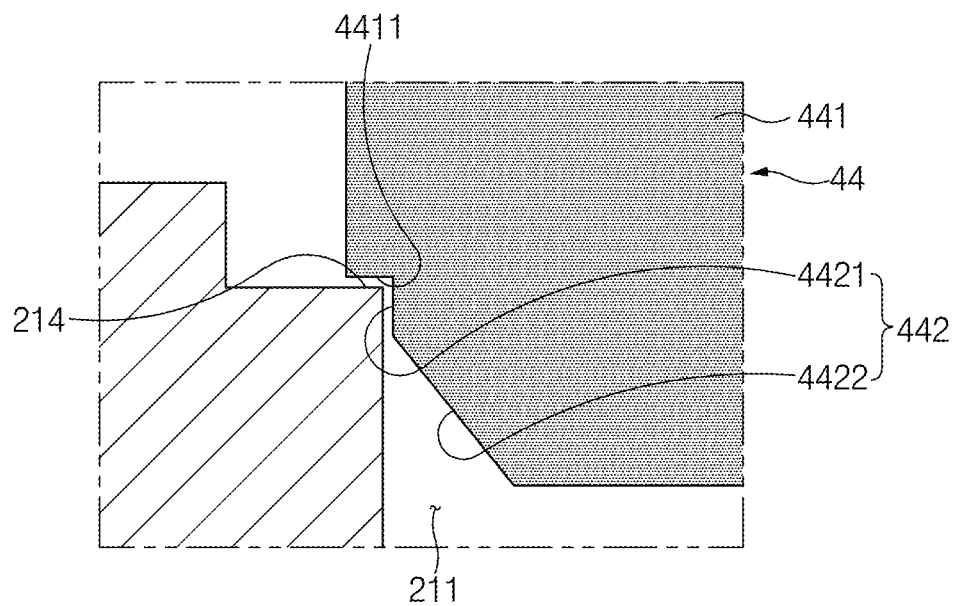
FIG. 11 is a detailed view illustrating a situation where the valve disc is inserted into a valve opening according to an embodiment of the present disclosure.

FIG. 8 is a vertical sectional view of a valve 2 according to another embodiment of the present disclosure. FIG. 9 is a perspective view of a valve disc 44 according to another embodiment of the present disclosure. FIG. 10 is a front view of the valve disc 44 according to the other embodiment of the present disclosure. FIG. 11 is a detailed view illustrating a situation where the valve disc 44 is inserted into a valve opening 211 according to an embodiment of the present disclosure.

The valve 2 according to the other embodiment of the present disclosure and the valve 1 according to the embodiment of the present disclosure may differ from each other in terms of the shape of the valve disc 44 and the presence or absence of the disc ring 154. Accordingly, the descriptions of the valve 1 according to the embodiment of the present disclosure may be identically applied to the valve 2 according to the other embodiment of the present disclosure.

The valve disc 44 may be formed of a material containing Polytetrafluoroethylene (PTFE). Due to low adhesiveness, excellent chemical, wear, and thermal resistance, and antifriction, PTFE is suitable to make direct contact with a valve seat 214 to close the valve opening 211 and maintain water tightness.

The valve disc 44 may have a pillar portion 441 and a protruding portion 442. The pillar portion 441 may be formed in the shape of a cylinder, the base of which has a larger diameter than the valve opening 211. The protruding portion 442 may protrude in a convex shape along a reference direction D from a side of the pillar portion 141 that faces the reference direction D. The protruding portion 442 may be formed to be inserted into the valve opening 211.

A step may be formed on a portion where the pillar portion 441 and the protruding portion 442 meet. Due to the step, a lower surface 4411 of the pillar portion 441 may make contact with the valve seat 214, which is formed around the valve opening 211, when the valve opening 211 is closed.

To form the step, the protruding portion 442 may have a protruding base portion 4421 formed in the shape of a cylinder, the base of which has a diameter smaller than or equal to the diameter of the valve opening 211. The protruding base portion 4421 may protrude in a cylindrical shape along the reference direction D from the pillar portion 441. Because the lower surface 4411 of the pillar portion 441 has a larger diameter than the valve opening 211, but the base of the protruding base portion 4421 has a diameter smaller than or equal to the diameter of the valve opening 211, the base of the protruding base portion 4421 may have a smaller diameter than the lower surface 4411 of the pillar portion 441 so that the step may be formed in the position where the pillar portion 441 and the protruding portion 442 meet.

The protruding base portion 4421 having the above-described diameter may be inserted and fitted into the valve opening 211 when the valve opening 211 is closed. A flow passage may be formed between boundaries of the protruding portion 442 and the valve opening 211. An outer surface of the protruding base portion 4421 may be brought into close contact with an inner surface of a body 20 that defines the valve opening 211 and may participate in closing the valve opening 211. That is, even without the disc ring 154 according to the embodiment, the outer surface of the protruding base portion 4421 and the lower surface 4411 of the pillar portion 441 may make contact with the inner surface of the body 20, which defines the valve opening 211, and the valve seat 214, respectively, to close the valve opening 211 and maintain water tightness.

The protruding portion 442 may include a protruding insert 4422. The protruding insert 4422 may protrude along the reference direction D from a side of the protruding base portion 4421 that faces the reference direction D. The protruding insert 4422 may have a shape in which the area of a cross-section perpendicular to the reference direction D gradually decreases along the reference direction D.

A distal end surface that is a flat surface formed at a distal end of the valve disc 44 that faces the reference direction D may be perpendicular to the reference direction D. That is, at a distal end of the protruding portion 442 that faces the reference direction D, the distal end surface may be formed as if it is cut with a plane perpendicular to the reference direction D.

The valve disc 44 may be formed such that the shape of an effective region "A" of a flow passage formed between the periphery of the valve opening 211 and a portion of an outer surface of the valve disc 44 that is most adjacent to the periphery of the valve opening 211 is formed like a side surface of a truncated cone when the valve disc 44 performs linear motion along the reference direction D. Here, the effective region "A" refers to a portion of the entire flow passage that has the smallest width and that determines the total flow rate of water flowing along the flow passage.

To form the effective region "A", the protruding insert 4422 of the valve disc 44 may have a tapered shape in which the area of a cross-section perpendicular to the reference direction D gradually decreases along the reference direction D. The shape of the valve disc 44 may be formed such that the area of the flow passage formed in the shape of the side surface of the truncated cone is linearly changed in proportion to displacement by which the valve disc 44 moves in the reference direction D or the opposite direction to the reference direction D.

Accordingly, the valves may be easily managed by assembling or disassembling the components of the valves.

A flow rate may be linearly regulated as a whole.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A valve comprising:
an actuation assembly including a drive device configured to generate a driving force, a needle shaft connected, at one end thereof, to the drive device to receive the driving force from the drive device and perform linear motion, a needle nut coupled to the drive device and having an empty space through which the needle shaft passes, so as to guide the linear motion of the needle shaft, and a valve disc coupled to an opposite end of the needle shaft;
a body coupled with the actuation assembly and having a valve opening inside, the valve opening being selectively opened or closed as the valve disc, which is inserted into the body in which water flows, performs linear motion;
a clip configured to fix the body and the actuation assembly such that the body and the actuation assembly are not separated from each other,
wherein the body includes a clip insertion opening formed through a portion of the body configured to surround the needle nut,
wherein the needle nut includes a clip insertion groove concavely formed on a portion of an outer surface of the needle nut that is inserted into the body, and
wherein the clip fixes the body and the actuation assembly by being inserted into the clip insertion groove while passing through the clip insertion opening,
wherein the clip includes an insert having two parallel legs inserted into the clip insertion groove and the clip insertion opening,
wherein the needle shaft includes a small-diameter part and a large-diameter part which has a larger diameter than that of the small-diameter part, wherein the small-diameter part extends from the large-diameter part, and
wherein the actuation device further includes a buffer ring coupled to the small-diameter part and disposed between the valve disc and the large-diameter part.

2. The valve of claim 1, wherein the clip further includes a handle having a shape bent and extending from the insert so as to be disposed outside the body when the insert fixes the body and the needle nut.

3. The valve of claim 1, wherein the valve disc is coupled to a distal end of the needle shaft configured to face a reference direction and to further protrude beyond the needle nut along the reference direction and has a convex shape along the reference direction.

4. The valve of claim 3, wherein a flat surface formed at a distal end of the valve disc configured to face the reference direction is perpendicular to the reference direction.

5. The valve of claim 1, wherein the valve disc is formed such that an effective region of a flow passage formed between a periphery of the valve opening and an outer surface of the valve disc that is most adjacent to the periphery of the valve opening is formed like a side surface of a truncated cone when the valve disc performs linear motion along a reference direction.

6. The valve of claim 1, further comprising:
an annular disc ring inserted into a disc groove concavely formed on an outer surface of the valve disc,
wherein an outer surface of the disc ring makes contact with an inner surface of the body to close the valve opening when the valve disc moves along a reference direction and is inserted into the valve opening, wherein the inner surface of the body defines the valve opening.

7. The valve of claim 6, wherein the valve disc includes:
a pillar portion formed in a cylindrical shape having a diameter smaller than or equal to a diameter of the valve opening; and
a protruding portion formed in a convex shape along the reference direction from a side of the pillar portion configured to face the reference direction, and
wherein the disc groove is concavely formed on an outer surface of a portion where the pillar portion and the protruding portion meet.

8. The valve of claim 6, wherein the disc ring is a Quad-ring having a cross-sectional shape with four protruding portions.

9. The valve of claim 1, wherein the valve disc includes:
a pillar portion formed in a cylindrical shape having a base with a larger diameter than the valve opening; and
a protruding portion inserted into the valve opening, wherein the protruding portion convexly protrudes along a reference direction from a side of the pillar portion configured to face the reference direction, and wherein a step is formed on a portion where the pillar portion and the protruding portion meet, such that a lower surface of the pillar portion makes contact with a valve seat formed around the valve opening when the valve opening is closed.

10. The valve of claim 9, wherein the protruding portion includes:
   a protruding base portion protruding in a cylindrical shape along the reference direction from the pillar portion so as to be inserted into the valve opening when the valve opening is closed, the protruding base portion having a base with a diameter smaller than or equal to a diameter of the valve opening; and
   a protruding insert protruding along the reference direction from a side of the protruding base portion configured to face the reference direction, the protruding insert having a shape in which an area of a cross-section perpendicular to the reference direction gradually decreases along the reference direction.

11. The valve of claim 1, wherein the valve disc is formed of a material containing PTFE(Polytetrafluoroethylene).

12. The valve of claim 1, wherein an external male thread is formed on a portion of an outer surface of the needle shaft,
   wherein an internal female thread engaged with the external male thread of the needle shaft is formed on a portion of an inner surface of the needle nut configured to define the empty space, and
   wherein the needle shaft performs linear motion along the inner surface of the needle nut while being rotating by the driving force transmitted from the drive device.

13. The valve of claim 1, wherein the actuation assembly further includes an annular shaft ring coupled to an outer surface of the needle shaft and configured to make contact with an inner surface of the needle nut to maintain water tightness, wherein the inner surface of the needle nut defines the empty space, and
   wherein the shaft ring is a Quad-ring having a cross-sectional shape with four protruding portions.

14. A valve comprising:
   an actuation assembly including a drive device configured to generate a driving force, a needle shaft connected, at one end thereof, to the drive device to receive the driving force from the drive device and perform linear motion, a needle nut coupled to the drive device and having an empty space through which the needle shaft passes, so as to guide the linear motion of the needle shaft, and a valve disc coupled to an opposite end of the needle shaft;
   a body coupled with the actuation assembly and having a valve opening inside, the valve opening being selectively opened or closed as the valve disc, which is inserted into the body in which water flows, performs linear motion,
   wherein the needle shaft includes a small-diameter part of which distal end is inserted into a center hole formed inside the body so that the motion of the needle shaft along a reference direction is guided by the center hole and a large-diameter part which has a larger diameter than that of the small-diameter part, wherein the small-diameter part extends along the reference direction from the large-diameter part,
   wherein the valve disc is coupled to the small-diameter part, configured to face the reference direction, further protrude beyond the needle nut along the reference direction, and have a convex shape along the reference direction, and the valve disc is formed such that an effective region of a flow passage formed between a periphery of the valve opening and an outer surface of the valve disc that is most adjacent to the periphery of the valve opening is formed like a side surface of a truncated cone when the valve disc performs the linear motion along the reference direction,
   wherein the small-diameter part is configured to pass through the valve disc, and
   wherein the actuation device further includes a buffer ring coupled to the small-diameter part and disposed between the valve disc and the large-diameter part.

* * * * *